(12) United States Patent
Clark (10) Patent No.: US 12,117,525 B2
(45) Date of Patent: Oct. 15, 2024

(54) SYSTEMS AND METHODS FOR DETECTING KNOWN AND UNKNOWN OBJECTS

(71) Applicant: Universal City Studios LLC, Universal City, CA (US)

(72) Inventor: Benjamin Robert Clark, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 89 days.

(21) Appl. No.: 17/582,721

(22) Filed: Jan. 24, 2022

(65) Prior Publication Data
US 2023/0236338 A1    Jul. 27, 2023

(51) Int. Cl.
| | | |
|---|---|---|
| G01S 17/04 | (2020.01) | |
| A63G 4/00 | (2006.01) | |
| G01S 17/88 | (2006.01) | |
| G01V 8/20 | (2006.01) | |
| G01V 8/22 | (2006.01) | |
| A63G 7/00 | (2006.01) | |
| G01S 7/48 | (2006.01) | |

(52) U.S. Cl.
CPC ............... *G01S 17/04* (2020.01); *A63G 4/00* (2013.01); *G01S 17/88* (2013.01); *G01V 8/20* (2013.01); *G01V 8/22* (2013.01); *A63G 7/00* (2013.01); *G01S 7/4802* (2013.01)

(58) Field of Classification Search
None
See application file for complete search history.

(56) References Cited

U.S. PATENT DOCUMENTS 10,668,391 B1 *   6/2020   Krauthamer .......... A63G 25/00
2015/0336015 A1    11/2015  Blum et al.
(Continued)

FOREIGN PATENT DOCUMENTS

DE    102016101269 A1 *   7/2017   ............... G01V 8/20
EP        2180348 A1        4/2010

OTHER PUBLICATIONS

Allen-Bradley, "Allen-Bradley GuardShield 450L-E Safety Light Curtain," Publication 450L-PP0028-EN-P, May 2020, pp. 1-2.
(Continued)

*Primary Examiner* — Jennifer D Bennett
*Assistant Examiner* — Erin R Garber
(74) *Attorney, Agent, or Firm* — Fletcher Yoder, P.C.

(57) ABSTRACT

A presence detection system includes a presence detection field of an amusement park attraction, multiple transmitters, multiple receivers, and a controller. The multiple transmitters send multiple light beams of multiple wavelengths and the multiple receivers receive the multiple light beams of the multiple wavelengths. The controller receives input from the multiple transmitters and receivers and determines presence of an object in the presence detection field based on an interruption of the multiple light beams as indicated by the input. The controller also determines reflected light beams of the multiple wavelengths, absorbed light beams of the multiple wavelengths, or both, based on the input. The controller determines the object as a known object or an unknown object based at least in part on the reflected light beams, the absorbed light beams, or both.

21 Claims, 5 Drawing Sheets

(56) References Cited

U.S. PATENT DOCUMENTS

| | | | |
|---|---|---|---|
| 2016/0266012 A1* | 9/2016 | Boutaud | G01V 13/00 |
| 2019/0049581 A1* | 2/2019 | Waslowski | G01S 7/481 |
| 2019/0244453 A1* | 8/2019 | Hewitt | G07C 9/00 |
| 2021/0016334 A1* | 1/2021 | Rothenaicher | B26D 5/007 |
| 2021/0260770 A1* | 8/2021 | Vu | G01S 17/87 |
| 2021/0326603 A1* | 10/2021 | Kempf | G05D 1/0094 |
| 2021/0405363 A1* | 12/2021 | Canberk | G02B 27/0101 |
| 2023/0030276 A1* | 2/2023 | Fernandez-Dorado | G06K 7/10752 |
| 2023/0081936 A1* | 3/2023 | Gütl | G01V 8/14 250/215 |

OTHER PUBLICATIONS

Allen-Bradley, "Guardmaster SC300 Hand Detection Safety Sensor," Publication 442L-PP001A-EN-P, Mar. 2012, pp. 1-4.

Allen-Bradley, "SafeZone™ Singlezone Safety Laser Scanner," Publication 442L-PP002A-EN-P, Feb. 2010, pp. 1-2.

Allen-Bradley, "Presence sensing safety devices," Publication GLSAFE-BR001C-EN-P, Jan. 2021, pp. 1-8.

Keyence, "Safety Laser Scanner—SZ-V Series," Retrieved from http://www.keyence.com/products/safety/laser-scanner/sz-v/, Reviewed on May 17, 2021, pp. 1-12.

Omron, "FBSG-R Series Safety Light Curtaianeatures," Retrieved from https://www.ia.omron.com/products/family/3403, Apr. 2, 2018, pp. 1-8.

SICK Sensor Intelligence., "MLG-2 Measuring Automation Light Grids," Retrieved from https://www.sick.com/us/en/automation-light-grids/measuring-automation-light-grids/mlg-2/c/g543486, Dec. 19, 2021, pp. 1-77.

Otto Goernemann et al., "Electra-Sensitive Protective Devices (ESPE) for Safe Machines," Opto-Electronic Protective Devices, Aug. 2017, pp. 1-16.

SICK Sensor Intelligence., "TWINOX4 Compact Design for Maximum Reliability," Opto-Electronic Protective Devices, Sep. 12, 2018, pp. 1-12.

PCT/US2023/011362 International Search Report and Written Opinion mailed Apr. 12, 2023.

* cited by examiner

SYSTEMS AND METHODS FOR DETECTING KNOWN AND UNKNOWN OBJECTS

BACKGROUND

In certain entertainment settings, such as a ride system in an amusement park, the presence or appearance of unknown or unexpected objects may be undesirable. The unexpected objects may produce undesirable effects for guest's belongings and the ride system, as well as result in a delay for subsequent rides caused by a series of procedures to resolve for or remove the unknown objects. For example, guests may place objects (e.g., personal devices, trash, purses, bags, souvenirs) outside of a ride vehicle during the course of a ride. The presence of such objects (e.g., garbage, food, phones, or even a guest's extremities) outside of the ride vehicle may be unexpected and unknown to the ride system and thus, may be referred to herein as unknown objects. The unknown objects that are unexpectedly present outside the ride vehicle may be exposed to contact with structures or machinery of the ride system during certain phases of the ride. Thus, during such phases, the presence of the unknown objects outside of the appropriate location (e.g., appropriately within the ride vehicle) may cause damage to the ride system and/or to the unknown objects. In view of the foregoing, while traditional ride systems typically prevent undesirable interactions with unknown objects via various traditional techniques, it is now recognized that improved and more efficient techniques are needed.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a presence detection system includes a presence detection field of an amusement park attraction, multiple transmitters, multiple receivers, and a controller. The multiple transmitters send multiple light beams of multiple wavelengths and the multiple receivers receive the multiple light beams of the multiple wavelengths. The controller receives input from the multiple transmitters and receivers and determines presence of an object in the presence detection field based on an interruption of the multiple light beams as indicated by the input. The controller also determines one or more reflected light beams of the multiple wavelengths, one or more absorbed light beams of the multiple wavelengths, or both, based on the input. Moreover, the controller determines the object as a known object or an unknown object based at least in part on the one or more reflected light beams of the multiple wavelengths, the one or more absorbed light beams of the multiple wavelengths, or both.

In one embodiment, a method includes determining presence of one or more objects in a field of interest based on an interruption of a through-beam light curtain formed by a first set of multiple transceivers disposed on a first side of the field of interest and a second set of multiple transceivers disposed on a second side of the field of interest. Moreover, the method includes, in response to determining presence of the one or more objects, converting the through-beam light curtain to a retroreflective light curtain. Furthermore, the method includes determining the one or more objects as approved objects or unapproved objects based at least in part on wavelengths of light from the retroreflective light curtain that are absorbed, reflected, or both, from the one or more objects.

In one embodiment, a light curtain device includes a memory and a processor. The memory stores instructions and the processor executes the instructions. The instructions cause the processor to determine presence of an object within a light curtain of the light curtain device and send multiple light beams of multiple wavelengths via multiple transceivers of the light curtain device. The instructions also cause the processor to determine one or more reflected light beams, one or more absorbed light beams, or both. Furthermore, the instructions cause the processor to determine the object as a known object or an unknown object based at least in part on the one or more reflected light beams, the one or more absorbed light beams, or both.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

The present disclosure relates generally to the field of amusement parks. Specifically, embodiments of the present disclosure relate to techniques for identifying known and unknown objects on a ride and efficiently resolving issues related to any identified unknown objects.

Entertainment settings may often include protective features and/or require guests to follow ride procedures to avoid undesired consequences. By way of example, a ride system may include one or more light curtain systems to control aspects of the ride. A light curtain system may operate to provide temporary suspensions of a light curtain system during particular phases of a ride, temporary blanking periods where a portion of the light curtain is bypassed (e.g., a portion fitting for the known ride vehicle), fixed channel blanking where a portion of the light curtain is permanently bypassed for a known object obstructing the light curtain, floating blanking where a number of consecutive light beams are blocked at any location varying in time, cascade blanking where light curtains are connected in a cascaded manner, and so forth. However, unknown objects may pass through certain bypassed light curtain portions or light beams intended for the known portions of the ride (e.g., the ride vehicle). Thus, traditional systems often require additional guards against unknown objects. As such, it is now recognized that improved systems are desirable to limit complexities of guard systems. It is further recognized that it may be difficult to distinguish between unknown and known objects passing through the light curtain during blanking periods or the bypass portions of the light curtain.

Ride systems may include ride features installed for the purpose of ensuring that the guests follow procedures for the ride. For example, the ride may include soft brushes that extend and brush against unknown objects, such as souvenirs, that are a predetermined distance (e.g., within an undesirable range) from the ride vehicle. Furthermore, the unexpected objects may cause the ride system to abruptly halt the ride vehicle, as well as additional ride vehicles on the ride, until the objects are removed from the protected space, such as until guests conform to the procedures by placing souvenirs back in the ride vehicle. As such, removing unknown objects or waiting for guests to conform to the ride procedures may result in delay and extended wait times for guests waiting for the ride to resume and for future guests waiting for an available ride vehicle.

As previously discussed, rides in an amusement park setting may implement protective features or protocols to prevent issues occurring due to unexpected objects in a ride path of a ride. For example, a ride system of the ride may utilize various sensors to detect presence of an object on the ride path. However, these objects may not indicate if the object is known or unknown, for example, and may not distinguish between an expected ride vehicle object or an unexpected guest object on the ride tracks. Often, guests may place objects, such as souvenirs, outside of the ride vehicle while on the ride. The objects may be positioned near machinery or other objects of the ride that may cause harm to the ride, objects, or both. For such instances, the ride system may utilize machine guards or nets, soft brushes, and the like, to cause the guest to pull the objects back into the ride vehicle. However, some areas of the ride, such as at a loading station for loading guests onto the ride vehicle, may have more machinery or stationary components than other areas of the ride but may not include machine guards or nets for protection since the ride vehicles need to access the loading station for loading and unloading guests. By way of example, the loading station may include a physical distance (e.g., a gap or space) between a moving belt sidewalk for guests to walk up to a ride vehicle and the ride track with the ride vehicles. The physical distance may be an issue for some guests (e.g., guest becomes misbalanced or object falls into spacing). Moreover, the ride vehicle may stop operations when and until the noncomplying guest is in compliance with procedures by pulling the object back into the ride vehicle. Verifying compliance may be performed manually by an operator, which may take substantial time (e.g., walk over to guest, confirm compliance, possibly watch previously noncomplying guest, as well as other guests on the ride, and so forth). As such, resuming operations may be delayed for a long period after verifying that each guest is complying with ride protocols.

Moreover, the ride system may include a light curtain system for detecting the unexpected objects. A light curtain is a presence sensing device that may include one or more transmitters and one or more receivers. The transmitter may transmit an infrared light beam or an array of light beams to the receiver (e.g., that may include photoelectric cells to detect reception of the infrared light beam). The light beams are emitted from the transmitter over a particular frequency or have a particular wavelength. Generally, the light curtain may include dedicated transmitters and receivers set adjacent (e.g., opposite) to each other, as well as integrated transmitters/receivers or transceivers where the light beam is bounced off of a reflector and reflected back at the transmitter, which also functions as the receiver. The array of light beams may be generated with minimal spacing between the beams to prevent objects from passing through the light beams. As such, an object positioned within the light curtain may interrupt the light beams, indicating presence of an object.

To enable expected objects to pass through the light curtain, such as the ride vehicle, the light curtain system may include time periods in which the light beams are muted or suspended, so that that light curtain function is disregarded and expected or known objects may pass through the curtain. However, unknown objects may also pass through the light curtain during this period. In some instances, the light curtain system may include a portion of light beams that are bypassed, in which the portion is a predefined space for known objects to pass through. However, unknown objects of similar size or smaller may also pass through this portion. As such, modifying the light curtain function to enable known objects to pass through may inadvertently enable unknown objects to pass through. Areas of the ride (e.g., machinery at the loading station) may not be protected for or from the unknown objects. As such, it may be desirable to provide a light curtain system that detects presence of objects, as well as determines whether the identified objects are expected or known objects (e.g., the ride vehicle that is part of the ride) or unexpected or unknown objects (e.g., souvenir held outside the ride vehicle by a guest, a guest walking near operating machinery intended for park personnel at the loading station, and so forth). It may also be desirable to provide a light curtain system that further identifies location of the objects, determines the speed at which the objects are traveling, tracking the objects, and/or resolving for potential issues (e.g., undesired contact).

It should be noted that although examples provided herein may be specifically directed to particular features of an amusement park, such as to detect and resolve for known and unknown objects on a ride, the techniques in this disclosure may be applied to other conditions and/or contexts. Thus, the present examples should be understood to reflect real-world examples of the amusement park to provide useful context for the discussion, and should not be viewed as limiting further applicability of the present approach. For example, the present disclosure should be understood as being applicable to additional situations in which detecting known and unknown objects along a path may be utilized, such as along ride tracks of a train, a manufacturing assembly line, roads in a construction zone, and so forth.

Figure 1:
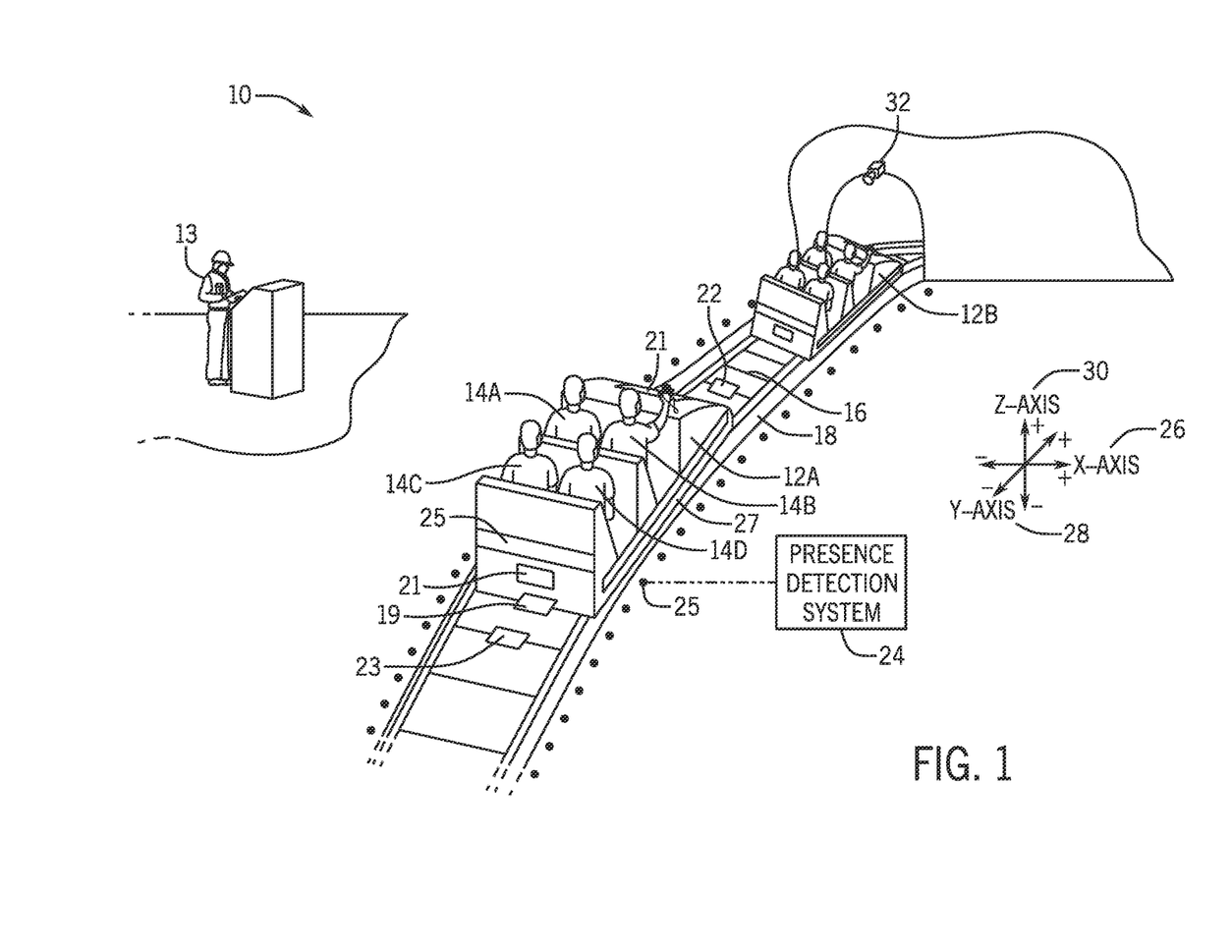
FIG. 1 is a schematic diagram of an amusement park ride with a presence detection system, in accordance with an embodiment of the present disclosure.

With the foregoing in mind, FIG. 1 is a schematic diagram of an amusement park ride 10 that may utilize the presence detection system discussed herein. By way of example, the presence detection may be used to identify expected or known objects, such as ride vehicles, as well as to identify unexpected or unknown objects, such as guests and/or guest's personal items (e.g., souvenirs, bags, food, clothes, and so forth) or even extremities (e.g., legs, arms, head, and so forth), along a ride path of the amusement park ride 10. Although the following discussions describe presence detecting sensors at the amusement park, as well as transceivers of the presence detection system for detecting presence of objects, the systems and methods described herein may use the transceivers alone to perform the functions of the presence detection system. For example, the transceivers used for forming a light curtain may be used for detecting presence of objects, distinguishing between the identified objects as known objects or unknown objects, identifying location of the objects within the ride (e.g., portion of ride tracks for approaching the load station), determining the speed at which the objects are traveling, tracking the objects, and/or resolving for presence of the unknown objects. The other presence detecting sensors may be used in conjunction with the light curtain to assist in object detection, for example, if the light curtain is not enabled when objects are not expected or present (e.g., to conserve power).

As shown, the amusement park ride 10 may include one or more ride vehicles 12 (e.g., a first ride vehicle 12A and a second ride vehicle 12B) and a ride operator 13. The ride operator 13 may manually verify that the ride vehicle 12 and guests 14 on the ride vehicle 12 are in compliance with ride procedures. However, relying on the ride operator 13 for guest compliance may result in long delays caused by the ride operator 13 resolving for compliance issues before resuming a paused amusement park ride 10.

Additionally or alternatively to the ride operator 13, the ride 10 may include ride compliance features (not shown) that may also ensure compliance with the ride procedures to protect against undesirable issues arising in areas of the amusement park ride 10. For example, the ride compliance features may include an audio system that sends an audible request to the guests 14 to comply with the ride procedures. The ride compliance features may also include physical objects, such as soft brushes, ride path railings, and so forth, that are active or triggered to activate upon detection of noncompliance. For example, and as shown in the depicted embodiment, the ride vehicle 12A includes a first guest 14A, a second guest 14B, a third guest 14C, and a fourth guest 14D. The second guest 14B is not complying with ride compliance procedures by holding the guest's 14B personal object, an extremity extended with a keychain, outside of the ride vehicle 12A. In this example, soft brushes may brush against the unexpected object (e.g., the personal object) when the unexpected object is positioned at a predetermined threshold distance outside the ride vehicle 12. The brushes against the unexpected object may cause the guest 14B to pull the souvenir back into the ride vehicle 12, complying with the protocols for the amusement park ride 10. In some embodiments, the amusement park ride 10 may not resume operation until the ride operator 13 manually resolves or verifies that each of the guests 14 are complying with the ride compliance procedures, often resulting in extended wait times between ride vehicles 12. Thus, the ride operator 13, the ride compliance features, and the like, may be costly features that are not directly part of the entertainment and that may cause delay for the amusement park ride 10.

As will be described herein, a presence detection system 24 may efficiently detect and identify known and unknown objects within a ride path, such as the ride vehicle 12 (e.g., known object) and the souvenir belonging to the guest (e.g., unknown object). Moreover, the presence detection system 24 may also efficiently resolve issues related to the identification of the unknown objects by facilitating an automatic pause, stop, change in acceleration of the ride vehicle, resume, and so forth, until compliance with the ride procedures is reinstated.

The amusement park ride 10 may include a ride path 16 with ride tracks 18. As previously mentioned, the guests 14 may be inside respective ride vehicles 12. The ride vehicles 12 may move along the ride path 16 of the amusement park ride 10 via the ride tracks 18. The ride tracks 18 may be straight, curved, or both, and may move the ride vehicle 12 along an x-axis 26, a y-axis 28, and a z-axis 30 in a three-dimension (3D) space based on the ride path 16 (e.g., move the ride vehicle 12 up in elevation along the positive z-axis 30). The amusement park ride 10 may include various sensors along the ride path 16 to detect presence of the ride vehicle 12 and/or a guest 14 (e.g., on the ride vehicle 12). Additionally or alternatively, and as will be discussed herein, the amusement park ride 10 may include transceivers 25 of the presence detection system 24 that include a transmitter and/or a receiver to form a light curtain system that detects presence of known objects, such as the ride vehicle 12, and unknown objects, such as objects that are not the ride vehicle 12. In some embodiments, the presence detection system 24 may be active at all times (e.g., turned on) or be activated periodically. For example, the presence detection system 24 may be active at all times to constantly and consistently monitor for known and unknown objects to ensure that the unknown objects are not present at or near the transceivers 25, to resolve for the unknown objects, or both. On the other hand, to conserve power, the presence detection system 24 may be activated upon a triggering event, such as upon detection of the ride vehicle 12 being close to ride features that may be damaged by guests 14 not complying with ride procedures for the amusement park ride 10. As previously mentioned, although the systems and methods described herein describe various sensors used in conjunction with the presence detection system 24, which represents a particular embodiment, the system and methods described herein may use only the presence detection system 24 to detect objects and distinguish between the objects as known or unknown objects.

In some embodiments, detecting the ride vehicle 12 using the sensors may trigger events within the amusement park ride 10, such as activating the presence detection system 24 to determine whether the detected objects are known objects (e.g., the ride vehicle 12) and unknown objects (e.g., personal objects belonging to the guests 14) along the ride path 16. As such, the sensors may be placed on the ride tracks 18 of the ride path 16 to detect the ride vehicles 12. In some embodiments, the sensors may include radio frequency identification (RFID) tags 19 incorporated into the ride vehicles 12 or guest wearable devices, weight sensors 22 along the ride tracks 18, and/or infrared (IR) markers 21 located on the ride vehicles 12 or incorporated on the guest wearable devices.

The RFID tags 19 may communicate with electronic readers 23 incorporated at different places on the amusement park ride 10, such as on the ride tracks 18, to indicate presence of the RFID tags 19. Thus, the electronic readers 23 placed on the ride tracks 18 may scan the RFID tags 19 on the ride vehicles 12 as the ride vehicles 12 pass over the electronic readers 23. Moreover, the RFID tags 19 may be placed at specific areas of the ride vehicles 12 and/or be different types of RFID tags 19 (e.g., placed towards the top of the front side of the ride vehicle 12 and towards the bottom of the back side of the ride vehicle 12, or different types placed on the front and back sides of the ride vehicle 12). In this manner, the RFID tag 19 placement and/or type may be used to determine specific sides of the ride vehicle 12, and this data may be used to identify known features on the amusement park ride 10 that may be exposed to unknown objects if the guests 14 do not to follow ride procedures, based on the guest's position or orientation within the ride vehicle 12 (e.g., guest may reach out to upcoming feature on the identified front side of the ride vehicle 12).

Similarly, the IR markers 21 may be placed on the ride vehicles 12. The IR markers 21 may include IR reflective surfaces that may be optically invisible to the guests 14 but that may be detected by cameras 32. The cameras 32 may be equipped to detect IR radiation reflected from the IR markers 21. In some embodiments, the RFID tags 19 or IR markers 21 may be strategically placed at particular intervals or specific points of interest on the ride tracks 18. For example, and as previously mentioned, the sensors may be placed in areas that include or are near features that may be damaged by the guests 14 upon noncompliance by the guests 14. In some embodiments, the cameras 32 that may be used to detect the ride vehicle 12 may activate after the ride vehicle 12 approaches a predetermined viewing range associated with the cameras 32, thereby conserving power. Similarly, tracking the ride vehicle 12 at specific points on the ride track 18 may be used to activate or deactivate the presence detection system 24. By way of example, the RFID tags 19 may indicate that a ride vehicle 12 is at the beginning of the ride path 16 and thus, a portion of the transceivers 25 of the presence detection system 24 located towards the beginning of the ride path 16 may be activated while transceivers 25 located towards to end of the ride path 16 may remain deactivated. Moreover, the RFID tags 19 or the IR markers 21 may be placed throughout the amusement park ride 10 in a manner that facilities determining the orientation of the ride vehicle 12 on the track (e.g., straight, turning, at a higher elevation, and so forth).

The guest wearable devices may also include the RFID tags 19 or the IR markers 21, which may be used to indicate guest presence in the ride vehicle 12 and activate the presence detection system 24. By way of example, the electronic reader 23 for the guest wearable device may be placed on the seat of the ride vehicle 12 and indicate guest presence when scanned. Additionally or alternatively, the IR markers 21 on the guest wearable device may be detected by cameras 32 using techniques previously described.

The weight sensors 22 may also be mounted on the ride track 18 to indicate presence of the ride vehicle 12 on the ride track 18 based on passing a predetermined weight threshold. As such, input from the sensors, such as the RFID tags 19, the IR markers 21, the cameras 32, and/or the weight sensors 22, may provide input data indicating detection of objects (e.g., the ride vehicle 12) for subsequent detection of unknown objects (e.g., objects that are not the ride vehicle 12). As such, the sensors may be used in conjunction with the presence detection system 24. In some embodiments, the presence detection system 24 may be used alone to detect and identify known objects, such as the ride vehicle 12, as well used to detect and identify unknown objects, such as guests 14 or personal objects associated with the guests 14.

Figure 2:
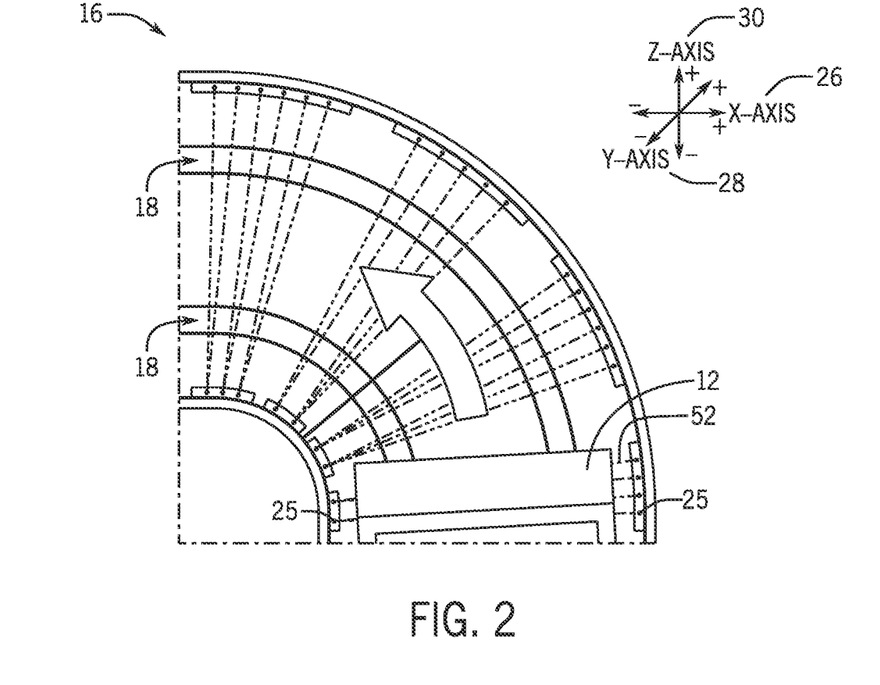
FIG. 2 is a schematic diagram of the presence detection system applied to a curved ride track of the amusement park ride of FIG. 1, in accordance with an embodiment of the present disclosure.

FIG. 2 illustrates a schematic diagram the presence detection system 24 applied to a curved ride path 16. As previously mentioned, the presence detection system 24 includes transceivers 25. In the current embodiment, the transceivers 25 are positioned on, near, or integrated with the ride tracks 18. The transceivers 25 may be placed on opposite sides of the ride tracks 18, such that the transceivers may communicate with each other to form the light curtain and generate a presence detection field 52. For example, with respect to the ride tracks 18 being positioned at the center of the x-axis 26, a transmitter of a first transceiver 25 positioned along the negative x-axis 26 and a receiver of a second transceiver 25 positioned along the positive x-axis 26, or vice versa, may communicate light beams (e.g., transmit light beams from the transmitter and receive light beams at the receiver) to generate the presence detection field 52. As previously mentioned, the light curtain that corresponds to the presence detection field 52 includes an array of light beams from multiple transceivers 25.

The presence detection system 24 may determine the wavelength of the light absorbed or reflected from an object detected within the presence detection field. If the object is an expected object, such as a ride vehicle 12, the object may include reflective material 27 (shown in FIG. 1) so that the presence detection system 24 may detect the object as a known object. The known object may absorb the light of other transmitted wavelengths. As will be discussed in detail in FIGS. 2-4, the reflective material 27, which may include reflective metal, paint, and the like, may reflect light of certain wavelengths. The combination of the reflected and absorbed wavelengths may be referred to as a signature combination that is approved or trusted so that the presence detection system 24 determines the detected signature combination as a known object. Thus, the presence detection system 24 may not take subsequent control measures to resolve for the object that are otherwise taken for an unknown object.

In some instances, a single transmitter of a transceiver 25 may communicate with multiple receivers of transceivers 25, a single receiver may communicate with multiple transmitters, or both. In particular, dimensions or length (e.g., distance) of the ride path 16 may not be uniform so the same number of transceivers 25 may not be placed on both sides of the ride path 16. For example, one side of a ride path 16 may be shorter than the opposite side of the ride path 16. Here, the ride path 16 curves, such that the length of the inner portion of ride path 16 is smaller and narrower than the length of the outer portion of the ride path 16. As such, fewer transceivers 25 may fit and be positioned along the inner portion of the ride path 16 than the outer, wider portion of the ride path 16. Thus, some of the transceivers 25, such as the transceivers 25 positioned along the inner portion, may communicate with multiple transceivers 25 on the outer portion of the ride path 16. The transmitters and receivers may communicate light beams to detect the known and the unknown objects.

Figure 3:
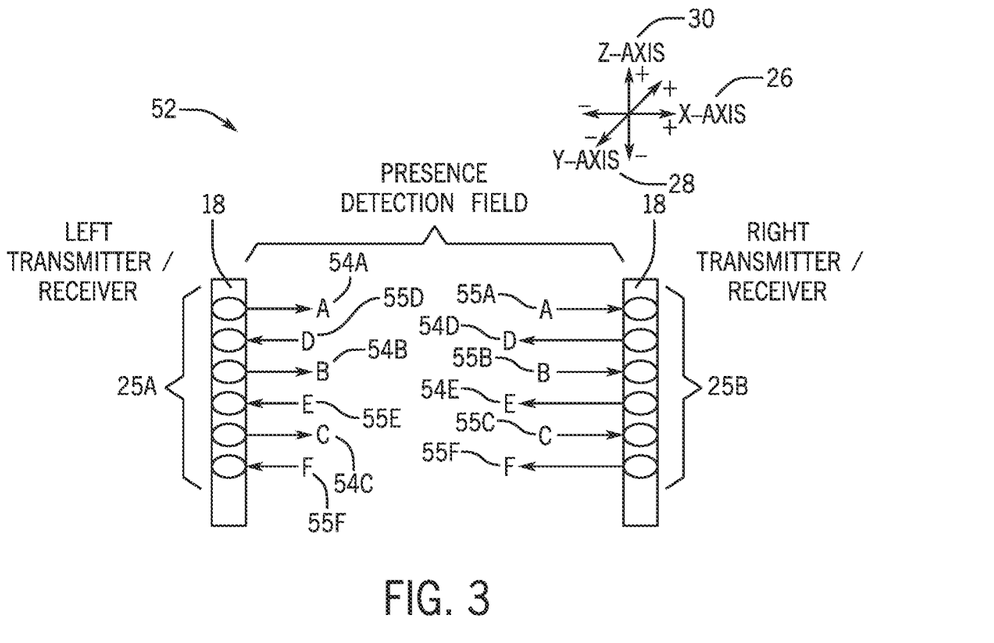
FIG. 3 is a schematic diagram of an open presence detection field of the presence detection system, in accordance with an embodiment of the present disclosure.

To illustrate, FIG. 3 is a schematic diagram of an open presence detection field 52 of the presence detection system 24. Although the following descriptions describe the presence detection system 24 utilizing light beams to detect the known and the unknown objects, which describes a particular embodiment, the systems and methods described herein may additionally or alternatively utilize any signal communicable to and from transceivers 25, such as any wireless signals and/or communicated over particular frequencies and the like. Additionally, although the following descriptions describe the known object as the ride vehicle 12 and the unknown object as any object that is not the ride vehicle 12, such as a personal object associated with a guest 14 (e.g., guest arm holding a souvenir), which represents a particular embodiment, the system and methods described herein may detect objects that are not limited to the ride vehicle 12 or non-ride vehicle objects. Moreover, the presence detection system 24 may detect one or more known objects and one or more unknown objects simultaneously.

In the depicted embodiment, left side transceivers 25A may communicate with right side transceivers 25B to generate the presence detection field 52. With respect to the ride tracks 18 positioned at the center of the x-axis 26, the left side transceivers 25A may be positioned along the negative x-axis 26 and the right side transceivers 25B may be positioned along the positive x-axis 26. As previously mentioned, the transceivers 25 may be near, on, or integrated with the ride tracks 18. In the depicted embodiment, the transceivers 25 are positioned on top of the ride tracks 18 to detect objects traveling within the presence detection field 52. In general, the transceivers 25 may be positioned to generate the presence detection field 52 in parallel to the ride path 16. In particular, the transceivers 25 may generate a planar presence detection field 52 encompassing a field of interest, such as from a floor of the amusement park ride 10 (e.g., below the ride tracks 18) up to the ride vehicle 12, as well as a field between the floor to a ride station for loading guests 14 onto the ride vehicles 12 (e.g., above or at the same level as the ride vehicle 12 and a wider area to encompass the ride station). Although the descriptions discussed herein describe the presence detection field 52 around a particular area of the amusement park ride 10 (e.g., such as at the ride station or along a particular portion of the ride path 16), which represents a particular embodiment, the systems and methods described herein may generate the presence detection field 52 in any 3D space (e.g., parallel along the x-axis 26, perpendicular along the y-axis 28, and/or along the z-axis 30) at any point of interest within the amusement park ride 10.

The left side transceiver 25A may include a first transmitter 54A (A), a second transmitter 54B (B), and a third transmitter 54C (C). The right side transceiver 25B may include a fourth transmitter 54D (D), a fifth transmitter 54E (E), and a sixth transmitter 54F (F). Additionally, the right side transceiver 25B may include a first receiver 55A (A), a second receiver 55B (B), and a third receiver 55C (C). The left side transceiver 25A may include a fourth receiver 55D (D), a fifth receiver 55E (E), and a sixth receiver 55F (F). The transmitters 54 may transmit light beams having particular wavelengths and the receivers 55 may receive the corresponding light beams of the particular wavelengths. For example, the transmitters 54 of the left side transceiver 25A may send the light beam of wavelengths A, B, and C (e.g., to be received by the receivers 55 of the right side transceiver 25B) and receive light beams of wavelengths D, E, and F (e.g., sent from the transmitters 54 of the right side transceiver 25B). On the other hand, transmitters 54 of the right side transceiver 25B may send light beams of wavelengths D, E, and F (e.g., to be received by the receivers 55 of the left side transceiver 25A) and receive light beams of wavelengths A, B, and C (e.g., sent from the transmitters 54 of the left side transceiver 25A).

The pairs of transmitters 54 and receivers 55, such as the first transmitter 54A of the left side transceiver 25A and the first receiver 55A of the right side transceiver 25B, may facilitate detecting objects in the presence detection field 52. In particular, the first receiver 55A of the right side transceiver 25B may expect to receive the light beam of wavelength A from the first transmitter 54A. However, if there is an obstruction in the presence detection field 52 caused by an object, the first receiver 55A may not receive the light beam of wavelength A. Similarly, each of the other receivers 55 may expect to receive the light beam having the respective wavelength (e.g., wavelengths B-F) from the corresponding transmitters 54. If they do not receive the expected light of the respective wavelengths, the presence detection system 24 may determine that an object is present in the presence detection field 52. The presence detection system 24 may be dynamic, such that upon detection of an object in the presence detection field 52, the transceivers 25 switch from a through-beam system to a retroreflective system, as described herein. The through-beam system may refer to the transmitters 54 and the receivers 55 positioned opposite to each other and communicating light beams of particular wavelengths (e.g., opposite sides of the ride tracks 18 and positioned in parallel), as described with respect to FIG. 2. The retroreflective system may refer to the transmitters 54 transmitting light beams of wavelengths to corresponding receivers 55 of the same transceivers 25 or different transceivers 25 but on the same side.

Figure 4:
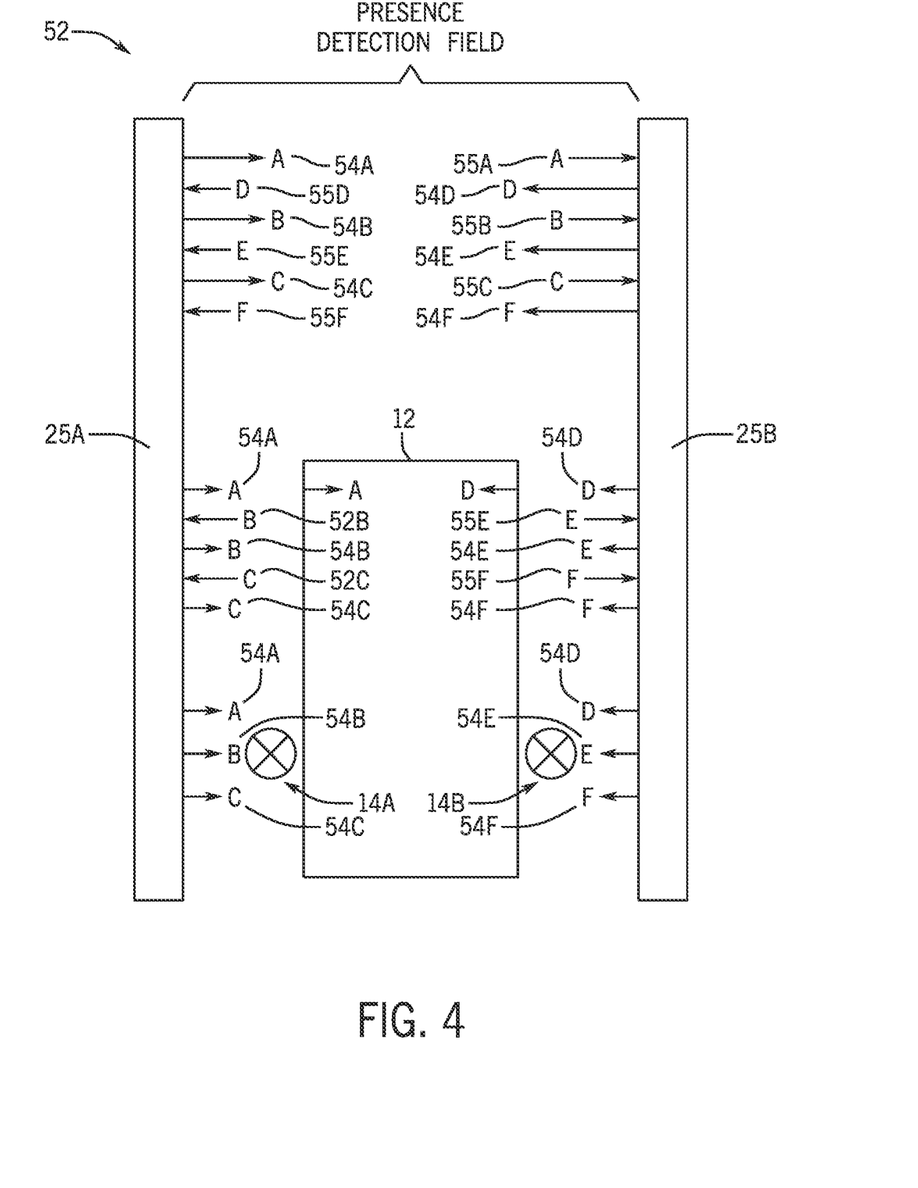
FIG. 4 is a schematic diagram of an occupied presence detection field of the presence detection system, in accordance with an embodiment of the present disclosure.

The objects may reflect light of some wavelengths while absorbing light of other wavelengths. Thus, to determine whether an object is a known object, the known object may be associated with one or more known wavelengths. For example, the known object may include reflective materials, retroreflective materials, and/or absorbing material. Reflective materials may include materials that reflect light or other radiation in any direction back towards the source while retroreflective materials include materials that reflect light directly back to the source (e.g., at or approximately at the same point). The reflective and retroreflective materials may include metal, paint, tape, fabric, and so forth, that provide the respective reflective and retroreflective properties. The reflective materials, the retroreflective materials, or both, of the known object may cause light reflection of certain wavelengths while the object also absorbs the light of other wavelengths. To illustrate, FIG. 4 is a schematic diagram of the presence detection field 52 occupied by an object. In the current embodiment, a ride vehicle 12 enters the presence detection field 52. As a result, the transmitted light beams of wavelength A, B, C, D, E, and F are obstructed and not received by the respective receivers 55. Not receiving the expected light beams at the receivers 55 may cause the presence detection system 24 to determine that an object is present in the presence detection field 52.

The presence detection system 24 may determine that the object is a known object based on one or more wavelengths that are reflected, absorbed, or both, from the detected object. In particular, the presence detection system 24 may store one or more combination of wavelengths as a signature or a reference identification (ID) for known objects. In the depicted embodiment, the combination may include absorbed wavelengths A and D and reflected wavelengths B, C, E, and F. Thus, after determining that an object is present, the presence detection system 24 may determine whether the object reflects and absorbs light having the combination of wavelengths known to the presence detection system 24 as an expected or known object, such that the amusement park ride 10 may continue. In particular, the presence detection system 24 may determine whether the light beams of wavelength A transmitted from the first transmitter 54A and the wavelength D transmitted from the fourth transmitter 54D, were transmitted and not received at the corresponding receivers 55A, 55D, indicating that they were absorbed by the object. The presence detection system 24 may also determine whether the light of wavelengths B, C, E, and F were reflected. Specifically, the receivers 55 of the transceivers 25 associated with the transmitters 54 sending these light beams (e.g., same transceiver 25), may receive the transmitted light beams so that the presence detection system 24 may determine whether the wavelengths for the received light beams are part of the known combination. For example, the right side transceiver 25B may activate one or more receivers 55 or switch from operating as a transmitter 54 transmitting to operating as a receiver 55 (e.g., the second receiver 55B to a fifth receiver 55E and the third receiver 55C to a sixth receiver 55F) to confirm that the light beams are of the expected wavelengths.

If the combination is different than the expected combination of absorbed wavelengths A and D and reflected wavelengths B, C, E, and F, then the presence detection system 24 may identify the detected object as an unknown object. As shown by the circle including a cross, the first guest 14A may have a personal object outside the ride vehicle 12, obstructing transmission of light beams from the first transmitter 54A, the second transmitter 54B, and the third transmitter 54C of the left side transceiver 25A. As such, the first receiver 55A, the second receiver 55B, and the third receiver 55C of the right side transceiver 25B may not receive expected light beams of wavelengths A, B, and C. Additionally, the ride vehicle 12 may not reflect the light of wavelength B or C due to the obstruction by the personal object, indicating an unknown object. As such, the presence detection system 24 may provide granular detections and determine known and unknown objects in close proximity, as well as simultaneously detect and identify multiple objects along the presence detection field 52 and determine if they are known or unknown objects. For example, the presence detection system 24 may identify a known object using a first set of transceivers 25 along the ride tracks 18 while also identifying an unknown object using a second set of transceivers 25 along the ride tracks 18. As such, the presence detection system 24 may enable known objects to pass through the presence detection field 52 while simultaneously preventing an unknown object from passing through the presence detection field 52. In some embodiments, the presence detection system 24 may prevent both known and unknown objects from passing through the presence detection field 52 when an unknown object is detected in the presence detection field 52, for example, based on ride protocols. Similarly, the second guest 14B may also have a personal object outside the ride vehicle 12, obstructing transmission of light beams from the fourth transmitter 54D, the fifth transmitter 54E, and the sixth transmitter 54F of the right side transceiver 25B. As such, the ride vehicle 12 may not absorb light of wavelength D, and the fifth receiver 55E and the sixth receiver 55F of the left side transceiver 25A may not receive the expected light beams of wavelengths E and F. As such, both instances of the personal objects outside the ride vehicle 12 may reflect and absorb unknown combinations of light beams, indicating that the personal objects are unknown objects.

As previously mentioned, in some embodiments, the presence detection system 24 may always be active (e.g., not deactivated for some time periods) to detect known and unknown objects moving through the presence detection field 52 at any point in time (e.g., before park opens or after park closes). Additionally or alternatively to detecting objects and identifying them as known or unknown objects, the presence detection system 24 may determine speed of the object, determine location of the object, and/or track the identified object.

In particular, the presence detection system 24 may store data indicating location of each of the transceivers 25, and each of the transceivers 25 may be individually identified. That is, the presence detection system 24 may refer to a profile of the ride path 16 that indicates where each of the transceivers 25 of a network of transceivers 25 is located. Thus, feedback indicating obstruction at particular transceivers 25 located at a known area of the ride path 16 may also provide an indication of the identified object. Moreover, after identifying the combination of reflected and absorbed wavelengths of a known or unknown object, the presence detection system 24 may track the object via the feedback from the transceivers 25 and based on the particular combination of the reflected and absorbed wavelengths associated with the known or unknown object. As the detected object moves along the ride path 16, the presence detection system 24 may determine the speed of the object based on the object traversing the transceivers 25 along the ride path 16. In particular, feedback from the transceivers 25 may indicate an obstructed path for a short duration at each of the transceivers 25 along the ride path 16, indicating a moving identified object (e.g., ride vehicle 12 that has left the loading station). For example, the speed may be measured by calculating the time since the transmitted light from a transmitter is obstructed until the corresponding receiver starts to receive the light again. The object may traverse the transceivers 25 along the ride path 16 at a particular pace corresponding to a speed.

In some embodiments, the presence detection system 24 may include sensors that track speed. That is, after determining the combination of reflected and absorbed wavelengths from the detected object, the presence detection system 24 may track the identified object based on the combination of reflected and absorbed wavelengths, and specifically track the speed at which the object passes the transceivers 25 or based on sensed speed via the sensors. The sensors that track speed may include proximity sensors, motion sensors, radars, ultrasonic sensors, and the like. Moreover, the presence detection system 24 may simultaneously detect presence of multiple objects (e.g., using the retroreflective techniques), identify the objects as known objects and unknown objects, track the objects, locate the objects, and determine their speeds.

Figure 5:
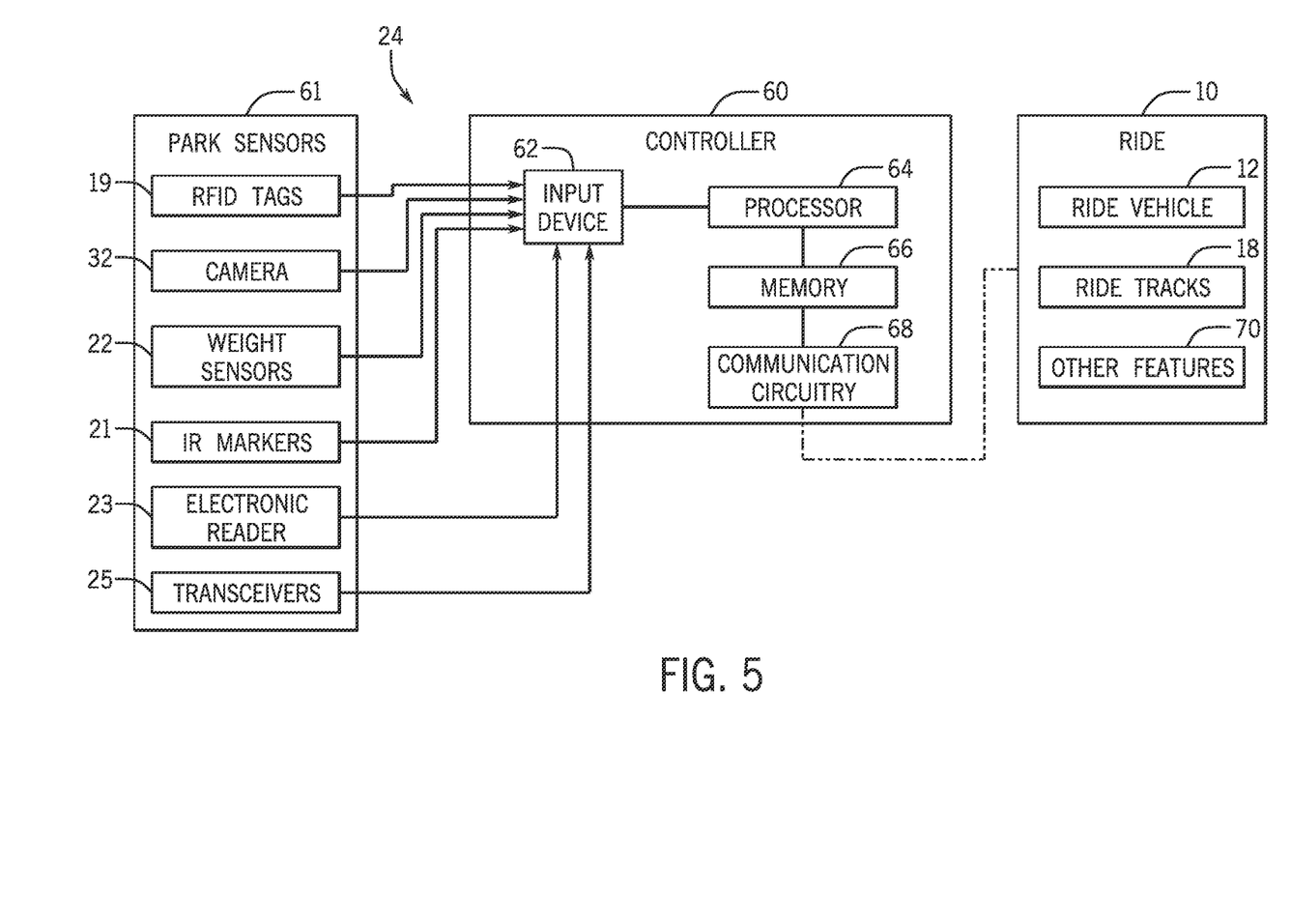
FIG. 5 is a block diagram of the presence detection system for detecting known and unknown objects along the amusement park ride, in accordance with an embodiment of the present disclosure.

FIG. 5 is a block diagram of the presence detection system 24 for detecting known and unknown objects along the amusement park ride 10. As shown, the presence detection system 24 includes a controller 60, transceivers 25, and park sensors 61, such as RFID tags 19, cameras 32, weight sensors 22, IR markers 21, and electronic readers 23 (e.g., RFID readers). As previously mentioned, the transceivers 25 may be used alone or in conjunction with other sensors (e.g., the RFID tags 19, the weight sensors 22, and so forth) to detect presence of an object in the presence detection field 52. The presence detection system 24 may also communicate with the amusement park ride 10 to control a ride vehicle 12, the ride tracks 18, and other features 70. It should be understood that the illustrated system is merely intended to be exemplary, and that certain features and components may be omitted and various other features and components may be added to facilitate performance, in accordance with the disclosed embodiments.

The controller 60 may include an input device 62, a processor 64, a memory 66, and a communication circuitry 68. The input device 62 may receive input data from the park sensors 61. Based on the input data received at the input device 62, the controller 60 may modify the ride 10, such as to stop the ride vehicle 12, re-route the ride vehicle 12, and/or adjust other features that may prevent or reduce possible damage to the features caused by an unknown object, such as by a personal object held out of the ride vehicle 12 by a guest 14, detected in the presence detection field 52. For example, the presence detection system 24 may activate systems that automatically remove the ride feature (e.g., pull back the ride feature from the ride path 16) prior to the guest 14 reaching the feature. In some embodiments, the presence detection system 24 may stop the ride vehicle 12. As previously discussed, the presence detection system 24 may determine location of the unknown object, track the unknown object, determine speed of the object, and so forth. In some embodiments, the presence detection system 24 may remove the ride feature based on this data. For example, the presence detection system 24 may stop the ride 10 if the unknown object is moving towards the ride feature above a threshold speed. On the other hand, the presence detection system 24 may remove the ride feature (e.g., activate side railings to create a barrier between the upcoming unknown object and the ride feature) prior to the unknown object reaching the ride feature if the speed of the unknown object is below the threshold speed. Additionally or alternatively, the presence detection system 24 may stop the ride vehicle 12 until the unknown object is removed (e.g., the souvenir is pulled back into the ride vehicle 12).

In particular, and as will be discussed in detail with respect to FIG. 6, the controller 60 may control the amusement park ride 10, for example, to stop the ride vehicle 12, remove or reduce exposure to ride features along the ride path 16, and so forth. As previously mentioned, the park sensors 61 may include the transceivers 25 alone since the transceivers 25, as described with respect to FIG. 2-4, may provide input to the presence detection system 24 that the presence detection system 24 uses to detect an object and determine whether the object is a known or an unknown object. In some embodiments, in addition to the transceivers 25, the park sensors 61 may include one or more radio frequency identification tags 19, one or more cameras 32, one or more weight sensors 22, one or more IR markers 21, and one or more electronic readers 23 (e.g., RFID readers). The park sensors 61 may be placed or positioned in areas where the guest presence is expected, such as on a ride vehicle 12 or a ride track 18 of the amusement park ride 10.

The RFID tags 19 may communicate with the electronic readers 23 to indicate presence of an object, such as the ride vehicle 12, the guest 14, or both, so that the presence detection system 24 may subsequently determine whether the object is a known or unknown object. In particular, the RFID tags 19 may be incorporated on the amusement park ride 10, such as on the ride tracks 18 or the ride vehicles 12 (e.g., inside, on the side, or on the entryway of the ride vehicle 12). Thus, the electronic readers 23 may be placed in a manner that allows scanning of the RFID tags 19. By way of example, electronic readers 23 may be placed on the ride tracks 18 so that the electronic readers 23 scan the RFID tags 19 on the ride vehicles 12 as the ride vehicles 12 pass over the electronic readers 23, indicating that an object is within the presence detection field 52.

In some embodiments, the cameras 32 may be placed or positioned in areas based on where object presence is expected within the presence detection field 52, such as to view the object on the ride path 16. The cameras 32 may determine the presence of the object based on images or video captured by the cameras 32. Additionally or alternatively, the weight sensors 22 may indicate presence of the object. The weight sensors 22 may be mounted on the ride tracks 18 and may indicate presence of the object on the ride tracks 18 based on a predetermined weight (e.g., approximate weight corresponding to a ride vehicle 12). Furthermore, IR markers 21 placed on objects, such as the ride vehicle 12, may reflect light identified by the cameras 32 to indicate presence of the object.

The controller 60 may enable the communication circuitry 68 to interface with various electronic devices, such as a monitoring system, a service desk, and so forth, of the amusement park. The monitoring system and/or the service desk may communicate with the controller 60 to receive and/or send information to ensure that the presence detection system 24 and/or the amusement park ride 10 are operating as expected. Additionally, or alternatively, the controller 60 may enable the communication circuitry 68 to interface with components of the amusement park ride 10.

For example, the communication circuitry 68 may allow the controller 60 to communicatively couple to a network, such as a personal area network (PAN), a local area network (LAN), and/or a wide area network (WAN). Accordingly, in some embodiments, the controller 60 may process data from the input device 62, determine presence of one or more objects in the presence detection field 52, determine whether the objects are known or unknown, determine modifications to the amusement park ride 10 based on the determination of the known and unknown objects, and communicate the modifications to the amusement park ride 10 via the communication circuitry 68. For example, after processing sensor data from the input device 62, the processor 64 may determine a control signal that enables the communication circuitry 68 to wirelessly transmit control data to the amusement park ride 10 to enable activation of the modifications (e.g., stop ride vehicle 12). In other embodiments, the communication circuitry 68 may be connected via a wired connection to the amusement park ride 10.

The processor 64 may include one or more processing devices that receive input signals from the input device 62 relating to the presence of one or more objects in the presence detection field 52, which may then be used to determine possible modifications to the amusement park ride 10, using techniques described herein. The memory 66 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired algorithms (e.g., program code) in the form of machine-executable instructions or data structures and which can be accessed by the processor 64 or by other processor-based devices. In particular, the processor 64 may include a processing core to execute machine-executable instruction algorithms stored in the memory 66. The processor 64 may also include processor-side interfaces for software applications running on the processing core to interact with hardware components on one or more amusement park rides 10 associated with the processor 64. The memory 66 may store a profile of a ride path 16 of an amusement park ride 10, location of the transceivers 25 within the ride path 16, signature combination of reflected and absorbed wavelengths for one or more objects that are expected to be in the presence detection field 52 and thus, may be considered known objects.

By way of example in the amusement park setting, the stored algorithms may include, but are not limited to, algorithms to determine the object presence within the presence detection field 52 based on sensor data from the park sensors 61 (e.g., the transceivers 25), determine the combination of reflected and absorbed wavelengths (e.g., signature), determine the object as either known or unknown based on the determined combination, determine modifications to the amusement park ride 10 based on the determination of the object as known or unknown, track the known or unknown object, determine traveling speed of the known or unknown object, determine location of the known or unknown object and/or with respect to ride features if the object violates certain ride protocols.

Figure 6:
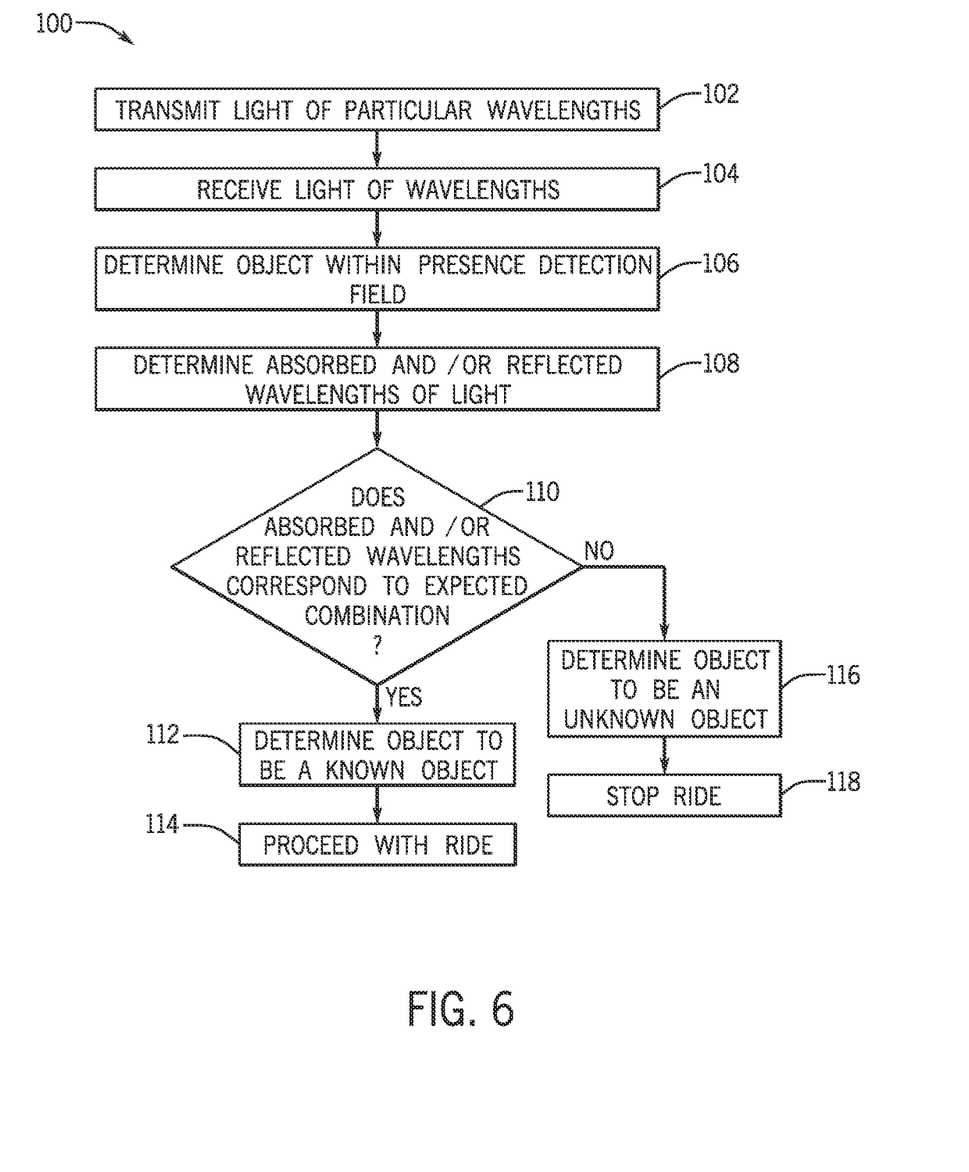
FIG. 6 is a process flow diagram of a method for detecting the known and the unknown objects along the amusement park ride, in accordance with an embodiment of the present disclosure.

FIG. 6 is a process flow diagram of a method 100 for detecting known and unknown objects along the amusement park ride 10 (e.g., within the presence detection field 52). While the method 100 is described using acts in a specific sequence, it should be understood that the described acts may be performed in different sequences than the sequence illustrated, and certain described acts may be skipped or not performed altogether. In general, at least some of the steps of the method 100 may be implemented at least in part by the presence detection system 24 of FIG. 5. Specifically, these steps may be implemented at least in part by the controller 60 and/or the processor 64 of the controller that executes instructions stored in a tangible, non-transitory, computer-readable medium, such as the memory 66. In alternative or additional embodiments, at least some steps of the method 100 may be implemented by any other suitable components or control logic, and the like.

The processor 64 may cause transmitters 54 of transceivers 25 to transmit (block 102) light (e.g., lasers) of particular wavelengths. The generated array of light transmitted may generate a presence detection field 52 to detect objects passing through the presence detection field. As previously discussed, the transceivers 25 may be strategically placed throughout the amusement park ride 10 in areas of interest that may include or lead up to particular ride features of the amusement park ride 10 and/or the amusement park that may be exposed to unknown objects. For example, transmitter 54 and receiver 55 pairs of transceivers 25 may be positioned along a field of interest, such as encompassing the ride tracks 18 and/or at a loading station of the amusement park ride 10.

In particular, one or more transmitters 54 on a first side of the intended presence detection field 52, such as on a left side of the ride tracks 18, may transmit light of particular wavelengths (e.g., wavelength A, B, and C) to one or more paired receivers 55 on a second side of the intended presence detection field 52, such as on a right side of the ride tracks 18 (e.g., a first transmitter 54A transmitting light of wavelength A to a first receiver 55A expecting to receive light of wavelength A). Similarly, one or more transmitters 54 on the second side may transmit light of particular wavelengths (e.g., wavelength D, E, and F) to one or more paired receivers 55 on the first side. The transmitted and received lights of particular wavelengths may generate the presence detection field 52 by creating the light curtain that is parallel (e.g., along the z-axis 30) to the ride tracks 18. Additionally or alternatively, the presence detection field 52 may be perpendicular (e.g., along the x-axis 26 or the y-axis 28) and anywhere on the amusement park ride 10 (e.g., above the ride tracks 18, below the ride tracks 18, at a stationary or moving loading station, and so forth). Moreover, the transceivers 25 may be placed closely together (e.g., equal to or less than one inch apart), such that the transmitted and received light creates a thorough light curtain without substantial area for objects (e.g., a key chain, a finger, and so forth) to pass through between the light beams.

The processor 64 may cause the receivers 55 of the transceivers 25 to receive (block 104) light of the particular wavelengths. That is, the receivers 55 on the second side of the presence detection field 52 may receive the light from the paired transmitters 54 (e.g., light of wavelengths A, B, and C) and the receivers on the first side of the presence detection field 52 may receive the light from the paired transmitters 54 (e.g., light of wavelengths D, E, and F). After generating the presence detection field 52 and while the paired transmitters 54 and receivers 55 are transmitting and receiving light of expected wavelengths, the processor 64 may determine (process block 106) an object within the presence detection field 52. As previously discussed in detail with respect to FIG. 3 and FIG. 4, the receivers 55 may not receive the light when an object is obstructing the path between the transmitters 54 and the receivers 55. As such, if the receivers 55 do not receive the expected light of the respective wavelengths, the processor 64 may determine that an object is present in the presence detection field 52 at the point of obstruction. In some embodiments, the processor 64 may also determine location of the object based on a profile of the ride path 16 and the location of the receivers 55 on the profile (e.g., the receivers 55 not receiving the light of the expected wavelengths).

After determining that an object is within the presence detection field 52, the processor 64 may cause the light curtain created by the transmitter 54 and corresponding receivers 55 to switch from creating a through-beam light curtain (e.g., through-beam laser configuration) to a retroreflective light curtain (e.g., retroreflective laser configuration), as previously discussed. The presence detection system 24 may convert from the through-beam light curtain to the retroreflective light curtain while the presence detection system 24 and the ride 10 are operating (e.g., reconfiguring during operation). Moreover, the presence detection system 24 may revert from the through-beam light curtain to the retroreflective light curtain upon removal of detected object. Subsequently, the processor 64 may determine (process block 108) absorbed and/or reflected wavelengths of light. That is, the same transceiver 25 may transmit and receive the light, or the transmitters 54 may be paired with receivers 55 on the same side, such that receivers 55 on the same side of the transmitters 54 or the same transceivers 25 may expect to receive light of wavelengths transmitted from the transmitters 54. The object obstructing the presence field detection 52 may absorb some light of certain wavelengths while reflecting light of other wavelengths. The transmitters 54 may provide feedback to the processor 64 that indicates the light of wavelengths that were transmitted but not reflected back to receivers 55 on the same side. Similarly, the receivers 55 may provide feedback to the processor 64 that indicates the light of wavelengths that were received after reflecting from the detected object.

The processor 64 may determine whether (decision block 110) the reflected and/or absorbed wavelengths correspond to an expected combination of absorbed and/or reflected wavelengths. In particular, the processor 64 may look up stored combinations of the reflected and/or absorbed wavelengths. The stored combinations may indicate that the object is a known or expected object, such that the amusement park ride 10 may continue the present operations (e.g., with the object in the presence detection field). In some embodiments, the stored combinations may tag the combination with a description of the known object (e.g., particular combination always corresponds to ride vehicles 12) for further processing. For example, the processor 64 may modify the amusement park ride 10 based on the description of the known object (e.g., slow down identified ride vehicle 12 when location is determined to be close to the loading station).

If the processor 64 determines that the combination of the absorbed and/or reflected wavelengths corresponds to an expected combination, the processor 64 may determine (block 112) that the object is a known object. That is, the object is expected to be within the presence detection field 52. In some embodiments, the processor 64 may identify the combination as a particular object for further processing, as previously discussed. After determining that the object is a known object, processor 64 may proceed (block 114) with the amusement park ride 10 since the object is expected to be in the presence detection field 52. In particular, the known object (e.g., ride vehicle 12) may be part of the amusement park ride 10 and/or not cause damage to the ride system. Moreover, and in contrast to temporary blanking periods of some light curtain systems, the known object may traverse the presence detection field 52 without a time input (e.g., at any time, expected or unexpected times since the object is an approved object).

In additional or alternative embodiments, the combinations may also include combinations of noncomplying objects or objects that may be identified so that the processor 64 modifies the amusement park ride 10 accordingly. For example, the stored combination may include a recurring combination seen for particular personal objects, such as a specific souvenir, a watch, and the like. As such, the processor 64 may control the amusement park ride 10 to stop the ride vehicle 12 with the noncomplying guest if the processor 64 determines that the unknown object may be exposed to a ride feature of the amusement park ride 10 in an unexpected manner (e.g., that may result in damage to the ride feature and/or the object). Thus, in some embodiments, the processor 64 may approve or reject an identified object based on the description associated with the known combination and a location of the object on the ride path 16 (e.g., based on the ride profile).

However, if the absorbed and/or reflected wavelengths do not correspond to the expected combination, the processor 64 may determine (block 116) that the object is an unknown object. That is, the processor 64 may determine that the object is not part of the amusement park ride 10 and is unexpected. As such, to confirm and/or verify compliance with ride protocols of the amusement park ride 10, the processor 64 may stop (block 118) the amusement park ride 10. That is, the processor 64 may halt or pause the ride vehicles 12 until protocol issues may be resolved. In some embodiments, the processor 64 may activate certain other features 70 to ensure that the unknown object is not subject to certain ride features and/or that the ride features are not subject to the unknown object. As such, the systems and methods described herein facilitate efficiently detecting presence of objects within an area of interest, identify the objects as known (e.g., expected, approved, or trusted) or unknown (e.g., unexpected, unapproved, untrusted, foreign), determine speed and/or location of the objects, and modify the amusement park ride 10 based on the known or unknown objects.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A presence detection system, comprising:
   a presence detection field within an amusement park ride;
   a plurality of transmitters configured to send a plurality of light beams of a plurality of wavelengths;
   a plurality of receivers configured to receive the plurality of light beams of the plurality of wavelengths, wherein the plurality of light beams is configured to form a through-beam light curtain during operation of the amusement park ride; and
   a controller configured to:
   receive input from the plurality of transmitters and the plurality of receivers;
   determine presence of an object in the presence detection field based on an interruption of the through-beam light curtain as indicated by the input;
   convert the through-beam light curtain to a retroreflective light curtain during operation of the amusement park ride in response to the presence of the object in the presence detection field;
   determine one or more reflected light beams of the retroreflective light curtain that are reflected by the object, one or more absorbed light beams of the retroreflective light curtain that are absorbed by the object, or both, based on the input;
   determine the object as a known object or an unknown object based at least in part on the one or more reflected light beams of the retroreflective light curtain, the one or more absorbed light beams of the retroreflective light curtain, or both.

2. The presence detection system of claim 1, wherein the controller is configured to determine one or more modifications to a device associated with the presence detection field based on the object being the unknown object.

3. The presence detection system of claim 1, wherein the presence detection field extends along a ride path of the amusement park ride.

4. The presence detection system of claim 1, wherein the controller is configured to determine a speed of travel for the object based at least in part on the input from the plurality of transmitters and the plurality of receivers.

5. The presence detection system of claim 1, wherein the controller is configured to track the object based at least in part on the input from the plurality of transmitters and the plurality of receivers.

6. The presence detection system of claim 1, wherein the controller is configured to automatically convert configuration of the plurality of transmitters, the plurality of receivers, or both, from a first configuration to a second configuration in response to determining the presence of the object.

7. The presence detection system of claim 6, wherein the first configuration comprises the through-beam light curtain and the second configuration comprises the retroreflective light curtain.

8. The presence detection system of claim 1, wherein the plurality of transmitters and the plurality of receivers form the through-beam light curtain of the plurality of light beams for the presence detection field, and wherein the through-beam light curtain is disposed in parallel to a direction of travel of the object.

9. The presence detection system of claim 1, wherein the controller is configured to simultaneously track multiple objects in the presence detection field, wherein the multiple objects are associated with different traveling speeds, locations, or both.

10. The presence detection system of claim 1, wherein the controller is configured to:
  determine the object as the known object and an additional object as the unknown object, and
  simultaneously enable the known object to pass through the presence detection field and prevent the unknown object from passing through the presence detection field.

11. The presence detection system of claim 1, wherein at least a portion of the presence detection field comprises a curve, and wherein the curve corresponds to a curved ride path of a ride of the amusement park ride.

12. The presence detection system of claim 1, wherein the controller is configured to determine one or more respective wavelengths of the plurality of wavelengths reflected by the object based on the one or more reflected light beams, one or more respective wavelengths of the plurality of wavelengths absorbed by the object based on the one or more absorbed light beams, or both.

13. The presence detection system of claim 1, wherein each transmitter of the plurality of transmitters is configured to send a respective light beam of a respective wavelength.

14. The presence detection system of claim 1, wherein the controller is configured to:
  store an expected combination of the plurality of wavelengths associated with the known object;
  determine a combination of one or more respective wavelengths of the plurality of wavelengths reflected by the object based on the one or more reflected light beams, one or more respective wavelengths of the plurality of wavelengths absorbed by the object based on the one or more absorbed light beams, or both; and
  determine the object as the known object based on the combination of the one or more respective wavelengths of the plurality of wavelengths reflected by the object, one or more respective wavelengths of the plurality of wavelengths absorbed by the object, or both corresponding to the expected combination.

15. The presence detection system of claim 1, wherein a first transmitter of the plurality of transmitters is configured to send a first light beam of the plurality of light beams, the first light beam of the plurality of light beams comprises a particular wavelength of the plurality of wavelengths, and the controller is configured to determine the object as the known object or the unknown object based at least in part on whether the first light beam is reflected by the object or absorbed by the object.

16. The presence detection system of claim 1, wherein the amusement park ride comprises a ride path, and wherein the ride path comprises one or more sensors to detect a ride vehicle along the ride path.

17. The presence detection system of claim 16, wherein the controller is configured to activate the presence detection system based on receiving one or more signals from the one or more sensors indicating detection of the ride vehicle along the ride path by the one or more sensors.

18. A method, comprising:
  determining a presence of one or more objects in a field of interest based on an interruption of a through-beam light curtain formed by a first plurality of transceivers disposed on a first side of the field of interest and a second plurality of transceivers disposed on a second side of the field of interest, wherein the field of interest is within an amusement park ride;
  in response to determining the presence of the one or more objects, converting the through-beam light curtain to a retroreflective light curtain during operation of the amusement park ride; and
  determining the one or more objects as approved objects or unapproved objects based at least in part on wavelengths of light from the retroreflective light curtain that are absorbed by the one or more objects, reflected by the one or more objects, or both.

19. The method of claim 18, wherein the field of interest comprises a loading station of the amusement park ride, a ride path of the amusement park ride, or both.

20. A light curtain device, comprising:
  a memory configured to store instructions; and
  a processor configured to execute the instructions, causing the processor to:
    determine presence of an object within a through-beam light curtain of a field of interest of the light curtain device, wherein the field of interest is within an amusement park ride;
    convert the through-beam light curtain to a retroreflective light curtain during operation of the amusement park ride in response to the presence of the object;
    send a plurality of light beams of a plurality of wavelengths via a plurality of transceivers of the light curtain device;
    determine one or more reflected light beams reflected by the object, one or more absorbed light beams absorbed by the object, or both; and
    determine the object as a known object or an unknown object based at least in part on the one or more reflected light beams, the one or more absorbed light beams, or both.

21. The light curtain device of claim 20, wherein the known object corresponds to an approved signature of the one or more reflected light beams, the one or more absorbed light beams, or both.

* * * * *